April 28, 1931.  J. P. McLIMANS  1,802,663
COLLAPSIBLE PORT FOR FURNACES
Filed July 28, 1927   3 Sheets-Sheet 1

Witness:
R. Burkhardt

Inventor:
John P. McLimans,
By L. Anthony Usma
atty.

April 28, 1931. J. P. McLIMANS 1,802,663
COLLAPSIBLE PORT FOR FURNACES
Filed July 28, 1927 3 Sheets-Sheet 2
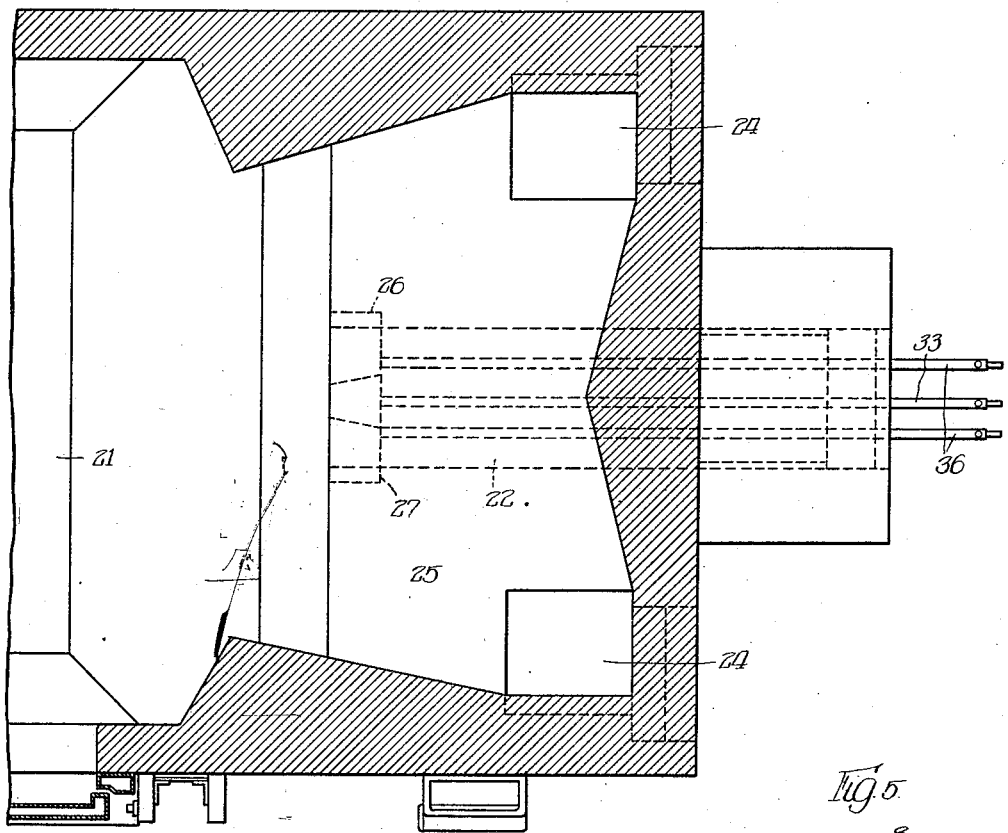
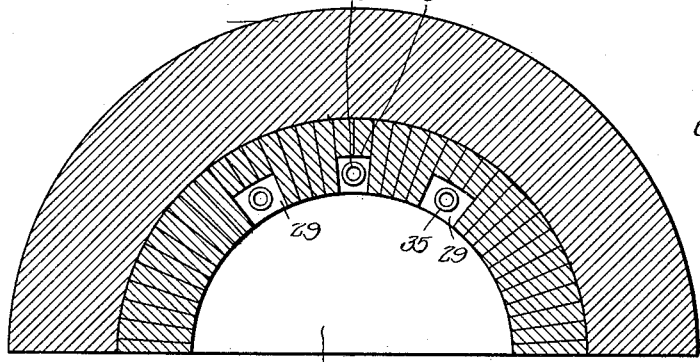
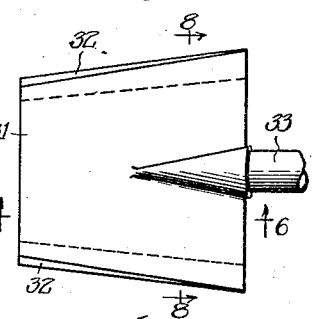
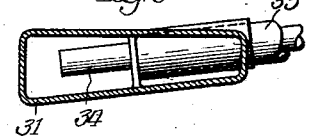
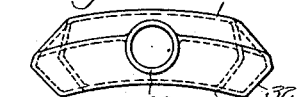

April 28, 1931. J. P. McLIMANS 1,802,663
COLLAPSIBLE PORT FOR FURNACES
Filed July 28, 1927 3 Sheets-Sheet 3
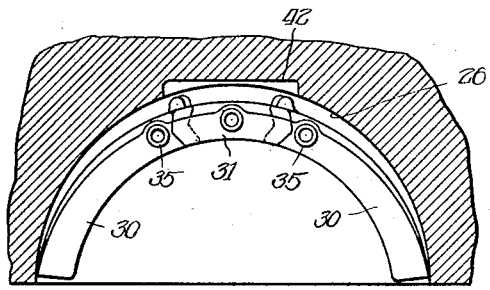
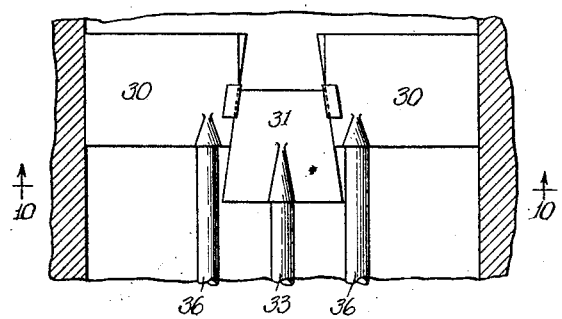
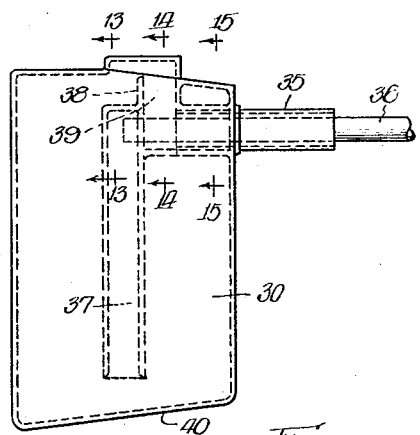
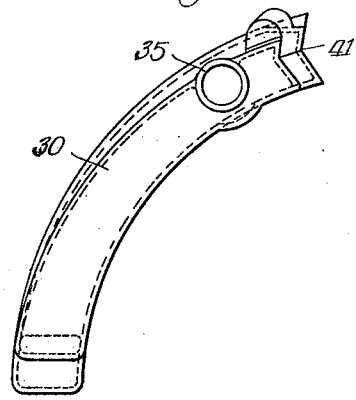
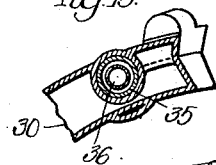
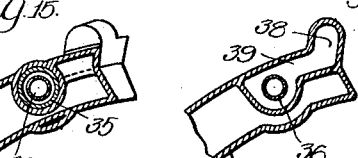
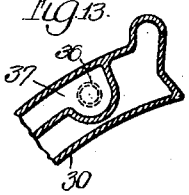
Inventor:
John P. McLimans, Patented Apr. 28, 1931

1,802,663

UNITED STATES PATENT OFFICE

JOHN P. McLIMANS, OF DULUTH, MINNESOTA

COLLAPSIBLE PORT FOR FURNACES

Application filed July 28, 1927. Serial No. 208,933.

This invention relates to a new and improved collapsible port for furnaces and more particularly to a collapsible water cooled structure particularly adapted for use in open hearth furnaces.

In reversible furnaces, such as those of the open hearth type where the ports are subjected to the erosive action of the outgoing gases during a portion of the furnace operation, it has been customary to provide water cooling means in order to maintain the port lines and prevent the port from being worn away. These water cooling means as heretofore constructed, have consisted of large metal elements permanently built into the port structure and having very considerable water cooled area. This large area has resulted in considerable heat losses during the operation of the furnace. The fact that the water cooling structure is permanently built into the port requires that the use of the furnace be stopped and that it be cooled down if any repairs or replacements of the water cooled structure are required.

It is an object of the present invention to provide a water cooled port structure having a minimum of water cooled area.

It is also an object to provide a construction of this character in which the water cooled elements may be readily removed and replaced without material interference with the furnace operation.

It is a further object to provide a water cooling structure consisting of a plurality of elements which coact with each other to mutually support each other in place.

It is an additional object to provide a multiple element cooling structure in which one element serves as a key to lock the other elements in place.

Other and further objects will appear as the description proceeds.

I have illustrated in the accompanying drawings a preferred embodiment of my invention.

In the drawings—

Figure 3 is a horizontal section taken on line 3—3 of Figure 1;

Figure 4 is a fragmentary vertical section taken on line 4—4 of Figure 1;

Figure 5 is a plan view of the key cooling element;

Figure 6 is a section taken on line 6—6 of Figure 5;

Figure 7 is a view of Figure 5 as seen from the right;

Figure 8 is a section on line 8—8 of Figure 5;

Figure 9 is a plan view showing the elements partly assembled;

Figure 10 is a section taken on line 10—10 of Figure 9;

Figure 11 is a view on an enlarged scale of one of the side cooling elements as seen from the rear;

Figure 12 is a view similar to Figure 11 but showing the elements as seen from the side, the internal construction being indicated in broken lines;

Figure 13 is a fragmentary section taken on line 13—13 of Figure 12;

Figure 14 is a fragmentary section taken on line 14—14 of Figure 12; and

Figure 15 is a fragmentary section taken on line 15—15 of Figure 12.

Figure 1:
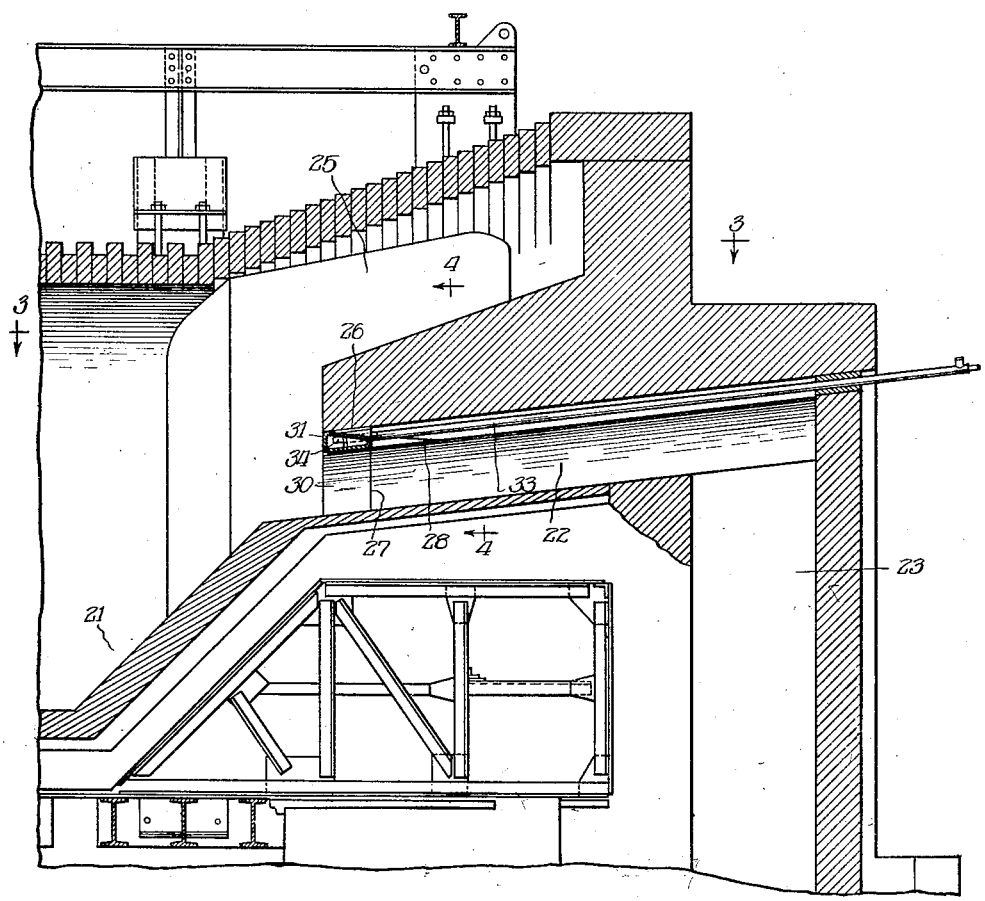
Figure 1 is a vertical longitudinal section of a furnace end showing my structure applied thereto.
Figure 2:
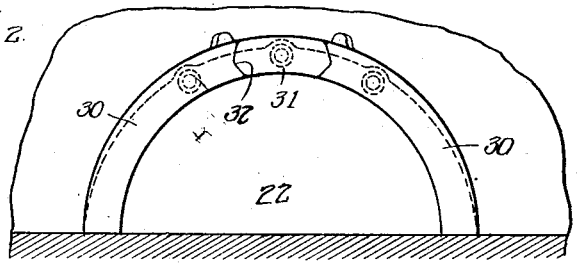
Figure 2 is a face view of the water cooling elements in assembled relation.

The furnace as shown is of a usual open hearth type having the melting chamber 21, the gas port 22, the gas uptake 23 and the air uptakes 24 leading to the air port 25. A recess 26 is formed in the brickwork adjacent the forward end of the port, this recess terminating in shoulders 27 upon the lateral portions thereof. The brickwork is sloped away along the line 28 from the upper portion of the recess 26 for a purpose which will appear hereafter. As best shown in Figure 4, the brickwork of the interior of the port is provided with a plurality of recesses 29 extending longitudinally of the port.

The water cooling structure consists of a pair of side elements 30 and a central key element 31. The central key element is shown in detail in Figures 5 to 8. Its sides 32 incline outwardly towards the rear of the element to give it a wedge-shaped formation, as clearly shown in Figure 5. These sides 32 are also formed of two outwardly sloping portions, as clearly shown in Figures 7 and 8 which fit against corresponding side formations of the side elements, as shown in the assembled figures.

The cooling water discharge pipe 33 is secured to the element 31 and contains within it the smaller pipe 34 which serves to feed the cooling water to the element. The pipe 34 extends well down into the element, as clearly shown in Figure 6. This brings the cooling water down against the outer face of the element while the heated water is drawn out through the pipe 33 from the rear end of the element around the pipe 34.

The side elements, as clearly shown in Figures 11 to 15, are also formed of hollow metal and have each connected thereto a large water discharge pipe 35. This pipe 35 encloses the smaller water feed pipe 36. The water feed pipe 36 discharges into the cavity 37 formed in the casting which cavity extends down adjacent the bottom of the casting. The heated water rises in the casting and is withdrawn over the partition 38 through the outlet chamber 39 which surrounds the smaller pipe 36. The lower edge 40 of the casting is on an angle corresponding to that of the floor of the port. The upper edge 41 is recessed to correspond to the edge of the central key member as previously described. The recess 26 formed in the port structure may be deepened at 42, as shown in Figure 10, to provide room for the upper enlargements of the side elements.

In assembling the water cooling structure in the furnace the two side elements are moved axially down the port from the rear until they are brought opposite the recess in the end of the port and are then moved laterally so that their lower portions are fitted within the recess. The central key member is then moved down axially of the port and brought into position between the upper edges of the side members. It is moved upwardly and forwardly on an angle through the extension 28 of the recess 26, forcing the two lateral elements apart, as indicated in Figure 9, until all three elements are firmly seated against the upper wall of the recess. The water pipes fit up into the axially extending recesses 29.

It will be apparent that the elements present a relatively small amount of cooling surface to the gases but adequately protect the port end which is most subject to erosion. The elements may be readily removed and replaced by new elements merely by breaking down a small portion of the rear wall of the gas uptake. This may be accomplished without material delay in the furnace operation.

While I have shown one preferred form of my invention by way of example, it is capable of wide modification in structure and I contemplate such variations and changes as come within the spirit and scope of the appended claims.

I claim:

1. In a furnace port, water cooling means for said port comprising a plurality of elements shaped to form an arch when in assembled relation, one of said elements being adapted by its shape to be forced between other of said elements to hold the assembly in arch formation.

2. In a furnace port, water cooling means for said port comprising three elements associated in arch formation, the central element being wedge-shaped and engaging inclined faces on the lateral elements.

3. In a furnace port construction, brickwork built to form an internal recess, and water cooling means comprising a plurality of elements adapted to be removably fitted in said recess, one of said elements being wedge-shaped and adapted to lock the elements in arch formation in said recess.

4. In a furnace port construction, brickwork built to form an internal recess, and water cooling means comprising a plurality of elements adapted to be removably fitted in said recess, one of said elements being wedge-shaped in a plane extending axially of the port and adapted to lock the elements in arch formation in said recess by movement axially of the port.

5. In a furnace port construction, brickwork built to form an internal recess having shoulders on its rear edge, side water cooling elements adapted to fit in said recess against the shoulders, and a key water cooling element adapted to be forced axially of the port between the side elements to lock them in place.

6. In a furnace port construction, brickwork built to form an internal recess having shoulders on its rear edge, side water cooling elements adapted to fit in said recess against the shoulders, and a key water cooling element adapted to be forced axially of the port between the side elements to lock them in place, the rear edge of the recess being cut away at its middle portion to permit axial movement of the key element.

7. A furnace including a port, a collapsible water cooling assembly mounted in said port, said assembly comprising a top key member and two side members shaped to receive said key member, water pipes communicating with each of said members and so arranged that the top key member may be inserted axially into place.

8. A furnace including a port, a collapsible water cooling assembly mounted in said port, said assembly comprising a top key member provided with wedge shaped side walls, and two side members shaped to receive said key member, water pipes communicating with each of said members and so arranged that the top key member may be inserted axially into place while said pipes remain connected thereto.

Signed at Duluth, Minnesota, this 28th day of April, 1927.

JOHN P. McLIMANS.